United States Patent [19]
Zisa

[11] 3,725,745
[45] Apr. 3, 1973

[54] VOLTAGE SURGE PROTECTION DEVICE FOR ELECTRIC METERS

[75] Inventor: William J. Zisa, Cary, N.C.

[73] Assignee: Westinghouse Electric Corporation, Pittsburgh, Pa.

[22] Filed: Sept. 23, 1971

[21] Appl. No.: 182,954

[52] U.S. Cl. ............... 317/104, 317/68, 324/110, 338/21
[51] Int. Cl. ........................... G01r 1/36, H02b 9/00
[58] Field of Search......... 317/9 R, 9 A, 13 R, 16, 61, 317/66, 68, 104, 107, 108, 105; 324/110; 337/28, 29, 34; 338/21

[56] References Cited

UNITED STATES PATENTS

| | | | |
|---|---|---|---|
| 2,889,494 | 6/1959 | Schmidt | 317/108 |
| 3,258,635 | 6/1966 | Carothers | 317/61 X |
| 2,501,322 | 3/1950 | Ferguson | 338/21 |
| 3,170,090 | 2/1965 | Waldrop | 317/107 |

*Primary Examiner*—Robert K. Schaefer
*Attorney*—A. T. Stratton

[57] ABSTRACT

A voltage surge protection device having a combined current limiter and arc discharge arrangement extending through the enclosure of an electric meter includes an improved outer contact strip with an integrally formed arcing electrode section. A U-shaped bend in the contact strip defines the arcing electrode section and is aligned with the central axis of a cooperating arcing electrode end of the current limiter. A predetermined spark gap spacing is formed between the electrodes for controlling arc discharges within a localized path. The current limiter includes a valve block having a heat shrinkable insulating cover for compressively reinforcing the body of the valve block against mechanical destruction and preventing arcing flashovers.

4 Claims, 6 Drawing Figures

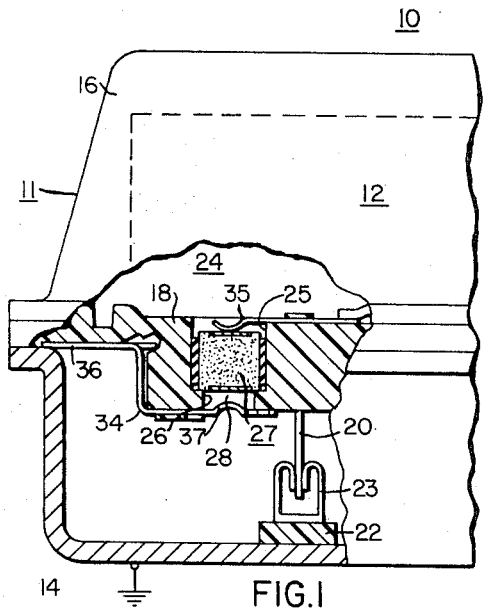
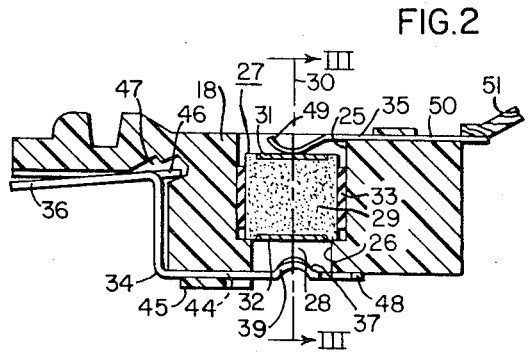
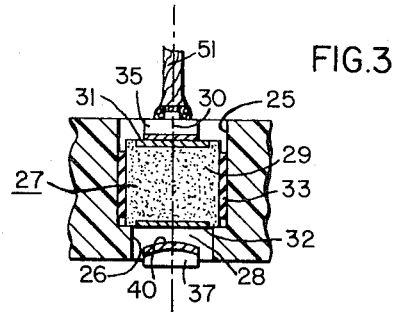
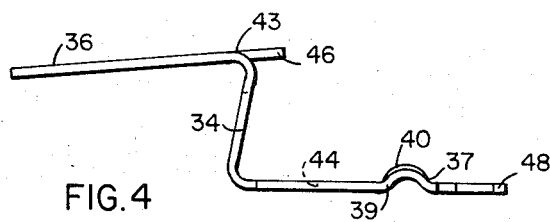
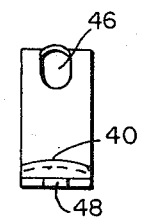
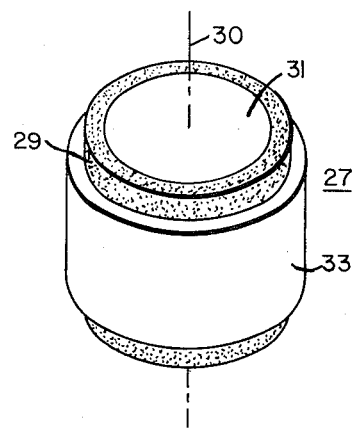

VOLTAGE SURGE PROTECTION DEVICE FOR ELECTRIC METERS

BACKGROUND OF THE INVENTION

This invention relates to a voltage surge protection device for a self-protecting electrical meter. The invention has particular application to watt-hour meters typically mounted at outdoor locations and electrically connected to utility power lines which are subjected to lightning impulses and high voltage transients.

The extended and unattended use of watt-hour meters requires construction features affording a high degree or reliability and protection for precision operation under a variety of environmental, mechanical and electrical operating conditions, as is well-known. This invention is directed to an improvement of a surge protection device of the type described in the application Ser. No. 708,854 filed Feb. 28, 1961, and assigned to the assignee of this invention. As noted in the aforementioned application, destructive effects of high voltage surges causes demagnetization effects on the bearings, the meter compensation magnets, and insulation breakdown of the metering coils. Burning and mechanical damage to the meter disk, the disk shaft, and the insulating material of the meter enclosure can also result from these surges.

Although various surge protection devices for watt-hour meters are known, many afford protection of the metering unit only and not to the enclosure or are not reusable nor self restoring therefore requiring service to the meter following each surge condition. For example, power follow current developed through a spark gap has been observed to cause splattering and deposition of conductive particles of the electrodes and travel through spurious discharge paths. Electrode splattering causes low resistance paths for the power follow current and with high levels of such current through ground connecting contacts they are often over heated or effectively welded to an associated socket of a detachable watt-hour meter. Such welded ground contacts result in destruction of the contacts when the watt-hour meter is removed from the socket and requires difficult and forceful removal of the meter. Further, high power follow current levels flowing through the arc and to the splattered electrode material also burn and destroy the insulating material of the meter enclosure or an insulation bushing supporting the protection device. Many of the aforementioned destructive effects of surge voltage arc discharges have been eliminated in electric meters by a current limiter which substantially reduces the power follow current and it is desirable to further improve the performance, reliability and cost of such voltage surge protection devices for electric meters by simpler and more efficient design and methods of manufacture.

SUMMARY OF THE INVENTION

In accordance with this invention, an improved voltage surge protection device extending between the exterior and interior of an electric meter enclosure has a current limiter connected in series with an improved arc discharge arrangement disposed toward the outer side of the enclosure. An outer contact strip carried on the meter enclosure is formed with an integral arcing electrode section for controlling and localizing the arcing discharges across a spark gap formed with an end electrode of the current limiter. The electrode section is U-shaped and projects along a smooth convex contour to maintain a predetermined spark gap spacing effective to confine the arcing discharges so as to prevent damage to the device and to adjacent meter parts. The simple contact strip design is low cost being capable of mass production and assembly to the meter enclosure while maintaining accurately controlled spark gap spacing.

Other advantages of this invention will be apparent from the following description made in conjunction with the drawings.

BRIEF DESCRIPTION OF THE DRAWINGS

FIG. 1 is a fragmentary side elevational view, partially in section, of a watt-hour meter including a voltage surge protection device made in accordance with this invention;

FIG. 2 is an enlarged partial view of FIG. 1;

FIG. 3 is a sectioned view of FIG. 2 taken along the axis III—III and looking in the direction of the arrow;

FIG. 4 is a side elevational view of an outer contact strip removed from the voltage surge protection device illustrated in FIG. 1.

FIG. 5 is an in end elevational view of the contact strip shown in FIG. 4; and

FIG. 6 is a perspective view of a current limiter removed from the voltage surge protection device illustrated in FIG. 1.

DESCRIPTION OF THE PREFERRED EMBODIMENT

Referring now to the drawings, and more particularly to FIG. 1, there is shown an electric meter 10 having a casing or enclosure 11 with an electro-responsive measuring unit formed by a watt-hour meter movement 12. The meter 10 is adapted for detachable mounting to a grounded meter socket 14. Detachable watt-hour meter enclosures of the type indicated by the numeral 11 are well understood by those skilled in the art and may be typically arranged as described in the Schmidt et al. U.S. Pat. No. 2,889,494 issued June 2, 1959, and assigned to the assignee of this invention. Generally, the meter enclosure 11 includes a glass cover 16 secured to a base 18 typically formed of a moldable insulation material such as a phenolic. A plurality of meter terminals, represented by the spade terminal 20, extend through the base 18 for making connection between the meter movement 12 and an external circuit such utility power lines, upon attachment to the meter socket 14. The meter socket 14 is formed by a cup-shaped electro-conductive material and includes an insulating socket base 22. Contact jaws, typically shown by the contact jaw designated 23, receive the meter terminals such as the spade terminal 20 for connecting the meter movement 12 between an electrical power line and a load.

A voltage surge protection device 24 made in accordance with the present invention is mounted on the base 18 at a pocket opening 25 having a substantially cylindrical configuration. The outer end of the opening 25 is terminated by an aperture 26 having a slightly reduced diameter from that of the opening 25. The walls of the aperture 26 define a spark gap chamber in accordance with the operation of the device 24.

Referring to the FIGS. 2 and 3, the principal parts of the surge protection device 24 include a current limiter 27 which is mounted within the pocket 25 and a spark gap arc discharge arrangement 28 within the aperture 26. The current limiter 27 as illustrated in FIG. 6 includes a valve block formed by a cylindrically shaped granular silicon carbide body 29. A binder for inhibiting the absorption of any substantial amounts of moisture is used for making the body 29 which may be constructed as described and claimed in the U.S. Pat. No. 2,501,322 issued Mar. 21, 1950 and assigned to the assignee of this invention. The current limiter 27 includes a central axis 30 disposed at substantially a right angle to the plane of the base 18 so that the end electrodes 31 and 32 thereof are exposed toward the interior and exterior, respectively, of the enclosure 11. The outer end electrode 32 rests on the shoulder formed by the reduced diameter of the aperture 26.

The end electrodes 31 and 32 are flat and are formed by spraying or coating an electro-conductive material to the ends of the body 29. A peripheral side surface of the body 29 includes an insulating cover 33. The insulating cover 33 forms a compressive collar as described further herein below and includes an electrical insulation characteristic for preventing flashover or arc travel along the side surface of the body 29 when a high voltage surge is applied between the end electrodes 31 and 32.

The voltage surge protection device 24 further includes an outer contact strip 34 illustrated in FIGS. 4 and 5, and an inner contact strip 35, both made of a stamped electro-conductive sheet metal material. The contact strip 35 engages the inner end electrode 31 for connecting the current limiter 27 to the meter movement 12. The outer contact strip 34 is attached to the exterior of the base 18 so that a first end is disposed toward the periphery of the base 18 and forms a ground connector section 36. The meter socket 14 is engaged by the ground connector section 36 as shown in FIG. 1 in a manner similar to that described in the aforementioned U.S. Pat. No. 2,889,494. The other or second end of the outer contact strip 34 includes an arcing electrode section 37 defining the spark gap 28 with the outer current limiter end electrode 32 when it is attached to the base 18 as illustrated.

The arcing electrode section 37 is formed by a short U-shaped bend 39 shown more clearly in FIG. 4 in the strip 34 directed toward the central axis 30 of the current limiter 26. The U-shaped bend 39 projects substantially perpendicular to the length of the second end of the contact strip 34 and in a plane including the axis 30. As shown in FIGS. 3 and 5, the electrode section 37 has a smooth convex contour 40 in a plane transverse to the length of the second end of the contact strip 34 and substantially parallel to the plane of the central axis 30. With the center or apex of the convex contour 40 aligned with the central axis 30, it is juxtapositioned the center of the end electrode 32. This defines the shortest and a predetermined spacing for the spark gap 28. An arcing discharge is localized between the current limiter 27 and the outer contact strip 34 within the spark gap chamber formed by the aperture 26.

The integrally formed electrode section 37 in the contact strip 34 serves to replace the contact button shown and described in the aforementioned application Ser. No. 708,854 and also described in the aforementioned U.S. Pat. No. 2,889,494. When the larger planar surfaces of the previously used contact buttons conduct an arcing discharge, substantial splattering of the contact button material has been noted by depositing electrode material within the walls of the aperture 26. This forms spurious low resistance discharge paths causing excessive heating resulting in burning and melting of an area surrounding the spark gap 28 especially when a current limiter is not included in combination with an arc discharge arrangement. The combined current limiter 27 and the spark gap 28 permits use of the improved configuration of the electrode section 37 to minimize the tendency of any electrode splattering and to control any spreading of the discharge away from alignment with the central axis 30 and toward the edges of the contact strip 34 thereby confining the arc discharge cross sectional area. The smooth convex contour 40 of the arcing electrode section 37 prevents any flash or irregular margins along the strip edges associated with stamping operations employed to form the outer contact strip 34. These edge margins can cause undesired spurious discharge paths away from along the central axis 30.

For attaching the outer contact strip 34, a mounting section 43 offsets the ground connector section 36 from the electrode section 37 as shown in FIGS. 1, 2, and 4. This arrangement corresponds to that described in the aforementioned U.S. Pat. No. 2,889,494 which also describes an aperture 44 in the mounting section 43 for receiving a base projection 45. The outer contact strip 34 is fastened to the base 18 by heat deforming the end of the projection in a riveting fashion. A tab 46 serving as an extension of the ground connector section which is in overlapping relationship with the mounting section 43 is fitted into a recess 47 formed in the base 18 as illustrated in FIG. 2. This facilitates retaining of the outer contact strip 34 on the base 48 when the ground connector section 36 is bent slightly for providing a resilient contact engaging force with the meter socket 14 when the enclosure 11 is mounted on the meter socket 14.

To provide further stability in the mounting of the outer contact strip 34 and maintain the predetermined spark gap spacing between the center of the arcing electrode section 37 and the end electrode 32, a tip portion 48 terminates the second end of the strip 34. The tip 48 extends beyond the edge of the aperture 26 and rests against the base 18. The offset at the mounting section 43 is arranged so that the tip portion 48 resiliently engages the base 18 and accurately positions the U-shaped bend 39 within the aperture 26.

By way of example and not limitation, in a preferred embodiment of the outer contact strip 34 it is formed from a resilient stainless steel sheet metal material having a thickness of 0.025 inch and a width of 0.250 inch. The U-shaped bend of the arcing electrode section 37 projects 0.06 inch above the top surface of the contact strip 34. The convex contour 40 is formed acurately with the center bowed approximately 0.02 inch above the opposite sides thereof adjacent the edges of the contact strip 34. This maintains the center of the electrode section 37 aligned with the central axis 30 of the current limiter 27 at a predetermined spacing relative to the lower end of the pocket 25 formed by the shoulder terminating the upper end of the aperture 26. Accordingly, the spacing of the spark gap 28 is established so that in the preferred embodiment the gap between end electrode 32 and the electrode section 37 will discharge a surge voltage in the order of 4 to 7 kilovolts.

The inner contact strip 35 is carried on the interior part of the base 18 so as to make contact at a first end 49 thereof, with the end electrode 31 of the current limiter 26. The resiliency at the first end 49 of the inner contact stip 35 maintains a spring contact engagement with the end electrode 31 of the current limiter 27. An integral section 50 at the second end of the contact strip 35 is adapted to make connection with an electrical conductor 51 connected with a current winding of the watt-hour meter movement 12 at a junction which is electrically common with the meter terminals such as the spade terminal 20.

Accordingly, with the contact jaw 23 connected with an external circuit, an excessive voltage surge is coupled through the space terminal 20, the inner contact strip 35 to the current limiter 27. The voltage responsive characteristic of the current limiter develops a reduced resistance to a high voltage surge as it discharges across the spark gap 28 while limiting the level of power follow current. The spark gap has a predetermined spacing so that the surge voltage develops a breakdown condition therein for discharging an arc across the spark gap 28 to the center of the electrode section 37 and the current is conducted through the ground connector section 36 to the grounded meter socket 14 and ground.

The insulation cover 33 of the valve block body 29 binds the peripheral side surface and is formed of a heat shrinkable insulation material which facilitates manufacturing and improves performance on the current limiter 27. The cover is made of an insulating tubing material composed of a polyvinyl chloride or its copolymers with vinyl acetate. One such material is available from the Minnesota Mining and Manufacturing Company, St. Paul, Minn. designated SCOTCHTITE 3028. The material of the cover 32 has a heat shrinking characteristic of about 50 percent and shrinks in approximately 5 seconds at a temperature of 450° F. The material is substantially stable in an operating temperature range in the order of 220° F.

In assembling the insulating cover 33 to the valve block body 29, a short length of tubing made of the heat shrinkable material is cut and assembled over the body of the valve block. The valve block body 29 and cover 33 are subjected to a temperature so that the tubing material shrinks so as to be completely bound to the body 29. This method of assembly accurately positions and maintains the thickness of the cover 33 as compared with the use of moldable compositions such as resins or epoxies which are often applied in a dry form r in a liquid state requiring careful control and attention to the application of the insulating materials to the periphery of the body 29. The compressive binding effect of the cover 33 adds mechanical strength since high voltage surges develop mechanical pressures in the body 29 tending to separate the granular silicon carbide body material.

The voltage surge protection device 24 has a primany intended use in the watt-hour meters connected to 120, 240, and 480 volt polyphase power systems. In such use, 60 Hz power follower current has been found to be limited to less that 25 amperes on 480 volt power lines and to less than 5 amperes on 240 volt power lines.

Although the invention has been described with reference to a preferred embodiment it is apparent that obvious modifications may be made without departing from the spirit and scope of the invention.

I claim as my invention:

1. An electric meter, a combination of an enclosure including an insulating base, said base having a hole opening extending therethrough, an electro-responsive measuring unit mounted within said enclosure, a meter terminal extending through said base for connecting said measuring unit to a meter socket terminal and an external circuit to measure, and a voltage surge protection device comprising; a voltage responsive current limiter having opposite end electrodes and located in said hole opening so that one of said end electrodes is exposed toward the interior of said base and the other of said end electrodes is exposed toward the exterior of said base; an inner contact member mounted within said enclosure, said inner contact member electrically connected between said one end electrode and said meter terminal; an outer contact member made of a thin elongated electro-conductive material and carried on the exterior of said base, said outer contact member including an arcing electrode section overlapping the other of said end electrodes of said current limiter; said arcing electrode section being formed integrally in said electroconductive material by a U-shaped bend formed along the length of said outer contact member so as to project along the central axis of said current limiter, said U-shaped bend extending transverse to the length along a convex arcuate contour such that the center of the transverse contour is aligned with the center of said other end electrode thereby defining a predetermined spark gap spacing therewith.

2. The electrode meter as claimed in claim 1 wherein; said hole opening is terminated by an aperture extending to the exterior of said base, said aperture receiving said arcing electrode section so as to form a chamber surrounding said spark gap.

3. The electric meter as claimed in claim 2 wherein said arcing electrode section is formed intermediate first and second ends of said outer contact member, said first end being disposed toward the periphery of said insulating base and including a ground connector section and said second end terminating in a tip portion extending across the edge of said aperture for resiliently engaging said insulating base so as to maintain said arcing electrode section in a fixed spark gap spaced relationship with said other end electrode of said current limiter.

4. The electric meter of claim 1 wherein said current limiter includes a valve block having a peripheral side surface and an insulating cover made of a heat shrinkable tubing material compressibly binding said side surface.

* * * * *